United States Patent
Doganata et al.

(10) Patent No.: US 7,089,250 B2
(45) Date of Patent: Aug. 8, 2006

(54) METHOD AND SYSTEM FOR ASSOCIATING EVENTS

(75) Inventors: Yurdaer N. Doganata, Chestnut Ridge, NY (US); Youssef Drissi, Ossining, NY (US); Tong-Haing Fin, Harrison, NY (US); Jun-Jang Jeng, White Plains, NY (US); Moon J. Kim, Wappingers Falls, NY (US); Lev Kozakov, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/681,612

(22) Filed: Oct. 8, 2003

(65) Prior Publication Data

US 2005/0080806 A1 Apr. 14, 2005

(51) Int. Cl.
*G06F 17/00* (2006.01)
*G06F 15/18* (2006.01)
*G06F 11/00* (2006.01)

(52) U.S. Cl. .......................... 707/100; 706/21; 714/39; 707/102

(58) Field of Classification Search ................ 707/100, 707/101, 102; 706/1; 714/39
See application file for complete search history.

(56) References Cited

U.S. PATENT DOCUMENTS 3,795,916 A * 3/1974 Wallace et al. ............... 714/55

| 4,769,761 A | 9/1988 | Downes et al. ............. 304/514 |
| 6,076,174 A | 6/2000 | Freund ......................... 714/47 |
| 6,134,676 A | 10/2000 | VanHuben et al. ........... 714/39 |
| 6,178,452 B1 | 1/2001 | Miyamoto .................. 709/224 |
| 6,279,001 B1 | 8/2001 | DeBettencourt et al. ...... 707/10 |
| 6,317,786 B1 | 11/2001 | Yamane et al. ............. 709/224 |

(Continued)

FOREIGN PATENT DOCUMENTS

JP 2000076161 A 11/2000 .................. 725/40

OTHER PUBLICATIONS

Remco C. de Boer: A Generic Architecture for Fusion-Based Intrusion Detection Systems, Erasmus University Rotterdam, Oct. 2002.*

*Primary Examiner*—John R. Cottingham
*Assistant Examiner*—Kuen S. Lu
(74) *Attorney, Agent, or Firm*—Schmeiser, Olsen & Watts; John R. Pivnichny

(57) ABSTRACT

A method, system, and computer program product for associating events. A provided event dataset includes events occurring in each of N successive time intervals ($N \geq 3$). Association rules pertaining to successive events in the event dataset are deduced. Sequences of events are generated from the association rules. Clusters of the sequences of events are formed. Sequences of the clusters are created. The clusters of the sequences may be used: to identify at least one event occurring in a time interval of the N time intervals as being a probable cause of at least one event occurring in a later-occurring time interval of the N time intervals; or to predict an occurrence of at least one event in a time interval occurring after the N time intervals, wherein the at least one event had occurred within the N time intervals.

30 Claims, 11 Drawing Sheets

U.S. PATENT DOCUMENTS

| | | | |
|---|---|---|---|
| 6,397,247 B1 | 5/2002 | Shirakawa et al. | 709/223 |
| 6,462,684 B1 | 10/2002 | Medelius et al. | 341/120 |
| 6,477,531 B1 | 11/2002 | Sullivan et al. | 707/10 |
| 6,507,852 B1 | 1/2003 | Dempsey et al. | 707/201 |
| 6,981,181 B1 * | 12/2005 | Dun et al. | 714/39 |
| 2003/0130967 A1 * | 7/2003 | Mannila et al. | 706/1 |
| 2004/0024773 A1 * | 2/2004 | Stoffel et al. | 707/102 |
| 2004/0073844 A1 * | 4/2004 | Unkle et al. | 714/39 |
| 2005/0283680 A1 * | 12/2005 | Kobayashi et al. | 714/39 |
| 2006/0085690 A1 * | 4/2006 | Bolen et al. | 714/39 |
| 2006/0085691 A1 * | 4/2006 | Rivera et al. | 714/39 |

* cited by examiner

Table of Hardware and Software.

| System Components |
| --- |
| CPU |
| BUS |
| MEMORY |
| SOFTWARE A |
| SOFTWARE B |

*FIG. 6*

Table of Operations and Error Types for System Components.

| System Component | Operations | Errors |
| --- | --- | --- |
| CPU | CPU-Op1 | CPU-Error1 |
|  | CPU-Op2 | CPU-Error2 |
| BUS | BUS-Op1 | BUS-Error1 |
|  | BUS-Op2 | BUS-Error2 |
| MEMORY | MEM-Op1 | MEM-Error1 |
|  | MEM-Op2 | MEM-Error2 |
| SOFTWARE A | SWA-Op1 | SWA-Error1 |
|  | SWA-Op2 | SWA-Error2 |
| SOFTWARE B | SWB-Op1 | SWB-Error1 |
|  | SWB-Op2 | SWB-Error2 |

*FIG. 7*

Vector Element Indexes For System Events Represented as Vectors.

| Element Index | Operations | Element Index | Errors |
| --- | --- | --- | --- |
| 1 | CPU-Op1 | 11 | CPU-Error1 |
| 2 | CPU-Op2 | 12 | CPU-Error2 |
| 3 | BUS-Op1 | 13 | BUS-Error1 |
| 4 | BUS-Op2 | 14 | BUS-Error2 |
| 5 | MEM-Op1 | 15 | MEM-Error1 |
| 6 | MEM-Op2 | 16 | MEM-Error2 |
| 7 | SWA-Op1 | 17 | SWA-Error1 |
| 8 | SWA-Op2 | 18 | SWA-Error2 |
| 9 | SWB-Op1 | 19 | SWB-Error1 |
| 10 | SWB-Op2 | 20 | SWB-Error2 |

*FIG. 8*

Events.

| Month | Events | Number of occurrences |
|---|---|---|
| 1 | $E_1$ = (0,0,0,0,0,0,0,1,0,0,0,0,0,0,0,0,0,0) | 200 |
|   | $E_2$ = (0,0,0,0,0,0,0,1,0,1,0,0,0,0,0,0,0,0) | 40 |
|   | $E_3$ = (1,0,0,0,1,0,1,1,0,1,0,1,1,0,1,0,0,1,0,0) | 10 |
|   | $E_4$ = (1,0,0,0,1,0,0,0,0,1,0,1,1,0,1,0,0,1,0,0) | 7 |
| 2 | $E_5$ = (1,0,0,1,1,0,0,0,0,1,0,1,1,0,1,0,0,0,0,0) | 150 |
|   | $E_{10}$ = (1,0,0,1,1,0,0,0,0,1,0,1,0,0,1,0,0,0,0,0) | 30 |
|   | $E_{12}$ = (1,0,0,1,1,0,0,0,0,1,0,0,0,0,1,0,0,0,0,0) | 10 |
|   | $E_{15}$ = (1,0,0,0,1,0,0,0,0,1,0,0,0,0,1,0,0,0,0,0) | 7 |
| 3 | $E_{16}$ = (1,0,1,0,0,0,0,0,0,1,0,0,0,0,1,0,0,0,0,0) | 29 |
|   | $E_6$ = (1,0,1,0,0,0,0,0,0,1,0,1,1,0,1,0,0,0,0,0) | 149 |
|   | $E_{11}$ = (1,1,0,1,0,1,0,1,0,0,1,0,1,0,0,0,0,0) | 7 |
| 4 | $E_8$ = (1,0,0,0,0,0,0,0,0,1,0,0,0,0,1,1,0,1,0,0) | 149 |
|   | $E_7$ = (1,0,0,0,0,0,0,0,0,1,0,0,0,0,1,0,1,1,0,0) | 29 |
|   | $E_9$ = (1,0,0,0,0,0,0,0,0,1,0,0,0,0,1,0,0,0,1,0) | 6 |
|   | $E_{13}$ = (1,0,0,0,0,0,0,0,0,1,0,0,0,0,1,0,0,0,1,1) | 7 |
| 5 | $E_{18}$ = (1,0,0,1,0,0,0,0,0,1,0,0,0,0,1,0,0,0,0,0) | 140 |
|   | $E_{17}$ = (1,0,0,1,0,0,0,0,0,1,0,0,0,0,1,0,0,0,0,1) | 25 |
|   | $E_{14}$ = (0,0,1,0,1,0,0,1,0,1,0,1,0,0,1,0,0,0,0,0) | 6 |
| 6 | $E_{19}$ = (0,0,0,0,0,0,0,0,1,1,0,0,0,0,1,0,0,0,0,0) | 139 |
|   | $E_{20}$ = (0,0,1,0,0,0,0,0,1,1,0,0,0,0,1,0,0,0,0,0) | 24 |
|   | $E_{15}$ = (1,0,0,0,0,0,0,0,0,1,0,0,0,0,1,0,1,0,0,0) | 6 |
|   | $E_{16}$ = (1,0,0,0,0,0,0,0,0,1,0,0,0,0,1,0,0,0,0,0) | 5 |

FIG. 9

Association Rules.

| Association Rule | Probability | Association Rule | Probability |
|---|---|---|---|
| $E_1 \Rightarrow E_5$ | 75% | $E_3 \Rightarrow E_{12}$ | 100% |
| $E_5 \Rightarrow E_6$ | 99% | $E_{12} \Rightarrow E_{11}$ | 70% |
| $E_6 \Rightarrow E_8$ | 100% | $E_{11} \Rightarrow E_9$ | 85% |
| $E_8 \Rightarrow E_{18}$ | 93% | $E_9 \Rightarrow E_{14}$ | 100% |
| $E_{18} \Rightarrow E_{19}$ | 99% | $E_{14} \Rightarrow E_{15}$ | 100% |
| $E_2 \Rightarrow E_{10}$ | 75% | $E_4 \Rightarrow E_{15}$ | 100% |
| $E_{10} \Rightarrow E_{16}$ | 96% | $E_{15} \Rightarrow E_{11}$ | 100% |
| $E_{16} \Rightarrow E_7$ | 100% | $E_{11} \Rightarrow E_{13}$ | 100% |
| $E_7 \Rightarrow E_{17}$ | 86% | $E_{13} \Rightarrow E_{14}$ | 85% |
| $E_{17} \Rightarrow E_{20}$ | 96% | $E_{14} \Rightarrow E_{16}$ | 83% |

FIG. 10

| Association Rule | Probability |
|---|---|
| E₁ ⇒ E₅ | 75% |
| E₅ ⇒ E₆ | 99% |

*FIG. 11*

| Event Sequence | Probability |
|---|---|
| E₁ → E₅ → E₆ | 75%*99% = 74% |

*FIG. 12*

Event Sequences.

| Event Sequence | Probability |
|---|---|
| E₁ → E₅ → E₆ → E₈ → E₁₈ → E₁₉ | 69% |
| E₂ → E₁₀ → E₁₆ → E₇ → E₁₇ → E₂₀ | 60% |
| E₃ → E₁₂ → E₁₁ → E₉ → E₁₄ → E₁₅ | 70% |
| E₄ → E₁₅ → E₁₁ → E₁₃ → E₁₄ → E₁₆ | 71% |

*FIG. 13*

Clusters.

| Month | Clusters | Events |
|---|---|---|
| 1 | $C_1$ | $E_1 = (0,0,0,0,0,0,0,1,0,0,0,0,0,0,0,0,0,0,0,0)$ |
|  |  | $E_2 = (0,0,0,0,0,0,0,1,0,1,0,0,0,0,0,0,0,0,0,0)$ |
|  | $C_2$ | $E_3 = (1,0,0,0,1,0,1,1,0,1,0,1,1,0,1,0,0,1,0,0)$ |
|  |  | $E_4 = (1,0,0,0,1,0,0,0,0,1,0,1,1,0,1,0,0,1,0,0)$ |
| 2 | $C_3$ | $E_5 = (1,0,0,1,1,0,0,0,0,1,0,1,1,0,1,0,0,0,0,0)$ |
|  |  | $E_{10} = (1,0,0,1,1,0,0,0,0,1,0,1,0,0,1,0,0,0,0,0)$ |
|  | $C_4$ | $E_{12} = (1,0,0,1,1,0,0,0,0,1,0,0,0,0,1,0,0,0,0,0)$ |
|  |  | $E_{15} = (1,0,0,0,1,0,0,0,0,1,0,0,0,0,1,0,0,0,0,0)$ |
| 3 | $C_5$ | $E_{16} = (1,0,1,0,0,0,0,0,0,1,0,0,0,0,1,0,0,0,0,0)$ |
|  |  | $E_6 = (1,0,1,0,0,0,0,0,0,1,0,1,1,0,1,0,0,0,0,0)$ |
|  | $C_6$ | $E_{11} = (1,1,0,1,0,1,0,1,0,1,0,0,1,0,1,0,0,0,0,0)$ |
| 4 | $C_7$ | $E_8 = (1,0,0,0,0,0,0,0,0,1,0,0,0,0,1,1,0,1,0,0)$ |
|  |  | $E_7 = (1,0,0,0,0,0,0,0,0,1,0,0,0,0,1,0,1,1,0,0)$ |
|  | $C_8$ | $E_9 = (1,0,0,0,0,0,0,0,0,1,0,0,0,0,1,0,0,0,1,0)$ |
|  |  | $E_{13} = (1,0,0,0,0,0,0,0,0,1,0,0,0,0,1,0,0,0,1,1)$ |
| 5 | $C_9$ | $E_{18} = (1,0,0,1,0,0,0,0,0,1,0,0,0,0,1,0,0,0,0,0)$ |
|  |  | $E_{17} = (1,0,0,1,0,0,0,0,0,1,0,0,0,0,1,0,0,0,0,1)$ |
|  | $C_{10}$ | $E_{14} = (0,0,1,0,1,0,0,1,0,1,0,1,0,0,1,0,0,0,0,0)$ |
| 6 | $C_{11}$ | $E_{19} = (0,0,0,0,0,0,0,0,1,1,0,0,0,0,1,0,0,0,0,0)$ |
|  |  | $E_{20} = (0,0,1,0,0,0,0,0,1,1,0,0,0,0,1,0,0,0,0,0)$ |
|  | $C_{12}$ | $E_{15} = (1,0,0,0,0,0,0,0,0,1,0,0,0,0,1,0,1,0,0,0)$ |
|  |  | $E_{16} = (1,0,0,0,0,0,0,0,0,1,0,0,0,0,1,0,0,0,0,0)$ |

FIG. 14

Sequences of Clusters.

| Sequence of Clusters | Probability |
|---|---|
| $C_1 \rightarrow C_3 \rightarrow C_5 \rightarrow C_7 \rightarrow C_9 \rightarrow C_{11}$ | 41% |
| $C_2 \rightarrow C_4 \rightarrow C_6 \rightarrow C_8 \rightarrow C_{10} \rightarrow C_{12}$ | 50% |

FIG. 15

METHOD AND SYSTEM FOR ASSOCIATING EVENTS

BACKGROUND OF THE INVENTION

1. Technical Field

The present invention relates to a method, system, and computer program product for associating events.

2. Related Art

In a web environment, preventing potential errors and failures has been a major issues in web system design. Unfortunately, preventing system errors and failures on a complex web system is very difficult. Accordingly, there is a need for an efficient and accurate method and system for preventing such errors and failures on such a complex web system.

SUMMARY OF THE INVENTION

The present invention provides a method for associating events, comprising the steps of:

providing an event dataset that includes a plurality of events occurring in each of N successive time intervals, said $N \geq 3$;

deducing from the event dataset a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

generating a plurality of sequences of events, each sequence of the plurality of sequences being generated from at least two sequentially ordered association rules of the plurality of association rules;

forming a plurality of clusters from the plurality of sequences in accordance with a clustering algorithm, each cluster of the plurality of clusters including at least two sequences of the plurality of sequences; and creating $S_C$ sequences of clusters from the plurality of clusters, said $S_C \geq 1$, each sequence of the $S_C$ sequences including at least two clusters of the plurality of clusters.

The present invention provides a system for associating events, comprising the steps of:

means for providing an event dataset that includes a plurality of events occurring in each of N successive time intervals, said $N \geq 3$;

means for deducing, from the event dataset, a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

means for generating a plurality of sequences of events, each sequence of the plurality of sequences being generated from at least two sequentially ordered association rules of the plurality of association rules;

means for forming a plurality of clusters from the plurality of sequences in accordance with a clustering algorithm, each cluster of the plurality of clusters including at least two sequences of the plurality of sequences; and means for creating $S_C$ sequences of clusters from the plurality of clusters, said $S_C \geq 1$, each sequence of the $S_C$ sequences including at least two clusters of the plurality of clusters.

The present invention provides a computer program product comprising a computer usable medium having a computer readable program embodied therein, said computer readable program adapted to access an event dataset that includes a plurality of events occurring in each of N successive time intervals, said computer readable program further adapted execute a method for associating events, said method comprising the steps of:

deducing from the event dataset a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

generating a plurality of sequences of events, each sequence of the plurality of sequences being generated from at least two sequentially ordered association rules of the plurality of association rules;

forming a plurality of clusters from the plurality of sequences in accordance with a clustering algorithm, each cluster of the plurality of clusters including at least two sequences of the plurality of sequences; and creating $S_C$ sequences of clusters from the plurality of clusters, said $S_C \geq 1$, each sequence of the $S_C$ sequences including at least two clusters of the plurality of clusters.

The present invention provides an efficient and accurate method and system for preventing errors and failures on a complex web system.

BRIEF DESCRIPTION OF THE DRAWINGS

FIG. 6 is a table listing hardware and software for system components of an autonomic computing system, in accordance with embodiments of the present invention.

FIG. 7 is a table listing operations and error types the system components of FIG. 6, in accordance with embodiments of the present invention.

FIG. 8 is a table listing vector element indexes for vectors describing executed operations and occurring errors, in accordance with embodiments of the present invention.

FIG. 9 is a table listing events recorded in the logs of the autonomic computing system, in accordance with embodiments of the present invention.

FIG. 10 is a table listing association rules deduced from the recorded events of FIG. 9, in accordance with embodiments of the present invention.

FIG. 11 is a table listing two of the association rules in FIG. 10, in accordance with embodiments of the present invention.

FIG. 12 is a table listing a sequence of events derived from the association rules in FIG. 11, in accordance with embodiments of the present invention.

FIG. 13 is a table listing sequences of events derived from the association rules of FIG. 10, in accordance with embodiments of the present invention.

FIG. 14 is a table listing clusters of the sequences of events of FIG. 13, in accordance with embodiments of the present invention.

FIG. 15 is a table listing sequences of the clusters of FIG. 14, in accordance with embodiments of the present invention.

DETAILED DESCRIPTION OF THE INVENTION

Figure 4:
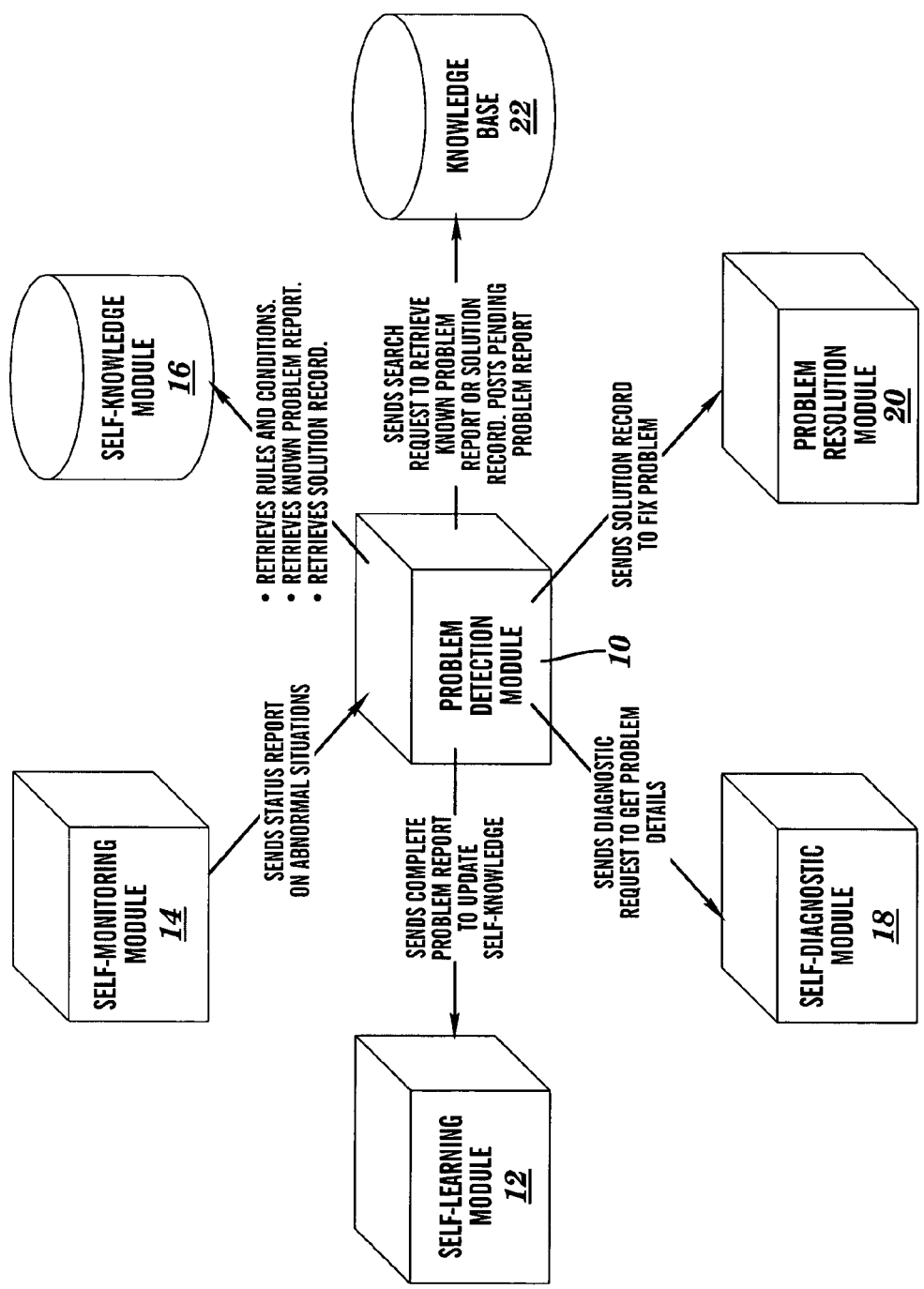
FIG. 4 depicts a modular software system for problem detection and error diagnostics for an autonomic computer system, in accordance with embodiments of the present invention.

The present invention relates to a method, system, and computer program product for associating events, and using the association of events to: identify probable cause(s) of some of said event(s); and predict occurrences of future events. The detailed description of the present invention comprises the sections of: Introduction To the Invention and General Formulation of the Invention Introduction To the Invention FIG. 4 depicts a modular software system for problem detection and error diagnostics for an autonomic computer system, in accordance with embodiments of the present invention. In FIG. 4, the modular software system is managed by a Problem Detection Module 10 which interfaces with other modules comprising: a Self-Learning Module 12, a Self-Monitoring Module 14, a Self-Knowledge Module 16, a Self-Diagnostic Module 18, and a Problem Resolution Module 20. The modular software system also includes a Knowledge Base 22 coupled to the Problem Detection Module 10, wherein the Knowledge Base 22 is a database that stores problem reports and solution records.

Each of the modules in FIG. 4 is associated with specific classes of events. Examples of "events" are occurrences of hardware and software errors in a computer system. Examples of such errors are the "Errors" listed in FIG. 7, and examples of the occurrences of said errors are listed the "Events" column of FIG. 9. Examples of classes of events are the "clusters" listed in FIG. 14. Note that FIGS. 7, 9, and 14 will be described infra in the context of an illustrated example.

Figure 5:
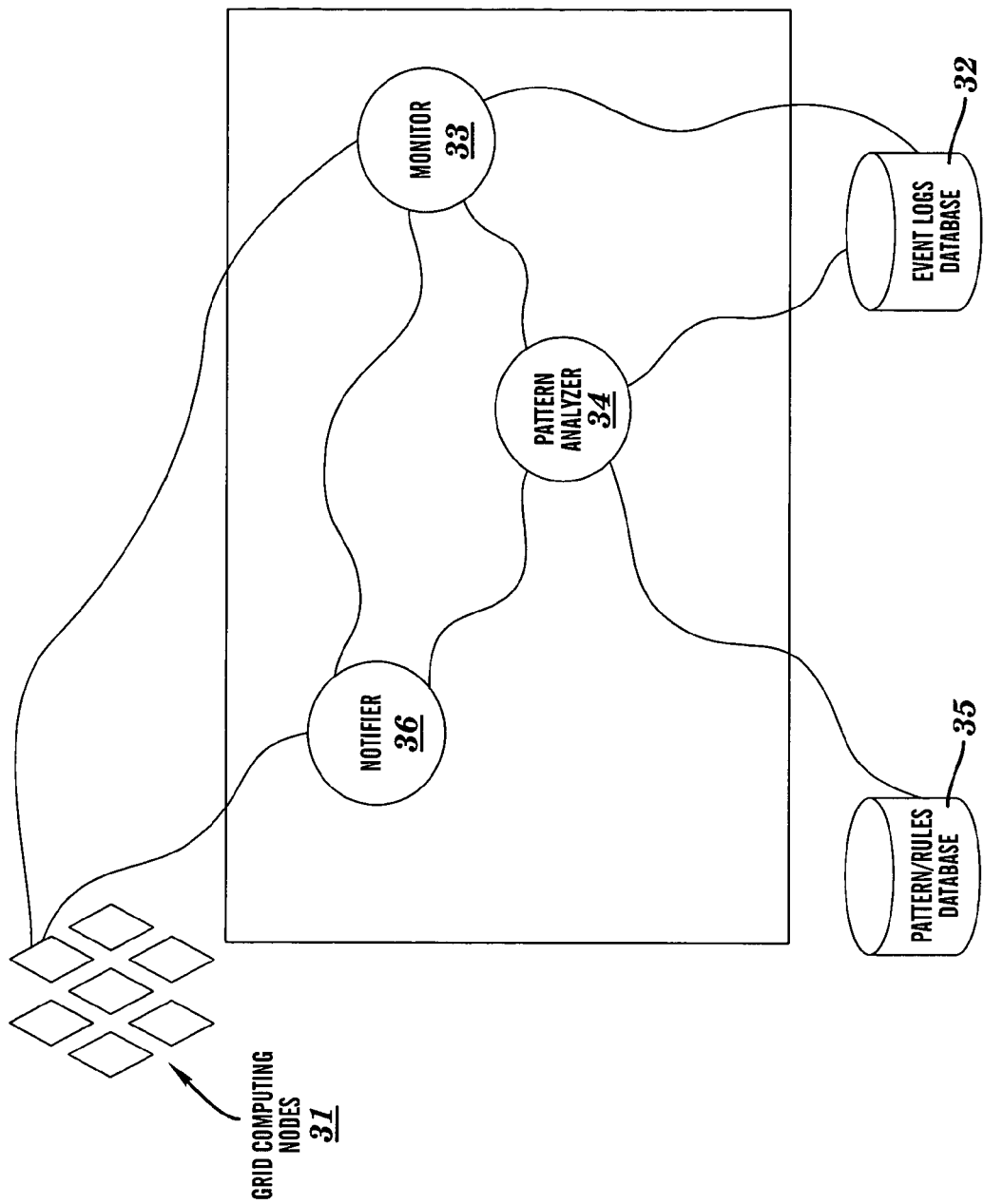
FIG. 5 depicts functional components of an autonomic computing system, in accordance with embodiments of the present invention.

Embodiments of the present invention are directed to monitoring and predicting errors in the autonomic computing system in connection with events associated with the preceding modules. Accordingly, FIG. 5 depicts functional components of the autonomic computing system, said functional components collectively being directed to collecting, organizing, patterning, and analyzing data from which errors may be monitored and predicted, in accordance with embodiments of the present invention. The functional components, which are coupled together as shown in FIG. 5, include: computing nodes 31, an event logs database 32, a monitor 33, a pattern analyzer 34, a pattern/rules database 35, and a notifier 36. Events from different nodes 31 are monitored and recorded in the event logs database 32. The pattern analyzer 4 extracts the event class sequences associated with system failures. If the monitor 33, matches a current event class with a sequence leading to a failure, then the monitor 33 invokes the notifier 6 to take an appropriate action.

The pattern/rules database 35 stores association rules derived from data comprising events that occurred and the frequency of occurrence of said events. An association rule may be expressed in the form $X \Rightarrow Y$, which means that if event X occurs in a first time interval $\Delta t_1$ then event Y will occur in a next time interval $\Delta t_2$, wherein the events $\Delta t_1$ and $\Delta t_2$ are successive time intervals, with a confidence (i.e., probability of occurrence) of c %. Thus, an association rule has an associated confidence or probability of occurrence. Examples of association rules are shown in FIG. 10, described infra in conjunction with the illustrated example. An algorithm for generating association rules is shown in Table 2, as described infra in the General Formulation section.

In an embodiment, the pattern analyzer 34 in FIG. 5 may perform the following tasks: discover patterns of event and event class sequences; and identify patterns of events and event classes leading to system failures. Thus, the pattern analyzer 34 may execute event predictions, event sequence predictions, and event class predictions.

As an example of using the present invention to monitor and predict errors in the autonomic computing system of FIGS. 4 and 5, consider the autonomic computer system to include the following hardware and software: CPU, BUS, MEMORY, HARD DISK, SCREEN, KEYBOARD, HARDWARE 1, HARDWARE 2, . . . , HARDWARE n, SOFTWARE A, SOFTWARE B, . . . , SOFTWARE Z. The users of the system start to notice several "system failures" during their normal daily operations. These system failures affect especially the MEMORY and the SOFTWARE B. A log of all the system events during the last 6 months is provided, and a task to build an automated diagnostic system which would allow finding the root cause of these "system failures" and would predict such errors in the future. Aspects of this example are depicted in FIGS. 6–15, in accordance with embodiments of the present invention.

To solve the "system failures" problem, the following steps are performed:
STEP 1: Build a data model for events
STEP 2: Extract temporal event association rules
STEP 3: Extract event sequences
STEP 4: Cluster events
STEP 5: Create sequences of clusters
STEP 6: Apply the cluster sequences to identify a probable cause of a system failure
STEP 7: Apply the cluster sequences to predict system failures STEP 1: Build a Data Model for Events For this example, consider the hardware and software system components listed in FIG. 6. Also, consider only a small number of operations and error types for each hardware and software listed in FIG. 6. Said operations and error types for each system component of FIG. 6 are listed in FIG. 7.

Each system event in this example is represented as a vector. Each element of the vector corresponds to an operation or an error from FIG. 7, and can have the value 0 or 1 in accordance with the vector element indexes of FIG. 8. For example the vector (1,0,0,0,0,0,0,0,0,1,0,0,0,0,1,0,0,0,0,0) corresponds to the event where the CPU-Op1 and SWB-Op2 operations are executed, and the MEM-Error1 error occurred, as may be seen from FIG. 8.

STEP 2: Extract Temporal Event Association Rules

The events recorded in the logs are divided into 6 groups (or buckets) corresponding to a six months total period of time as shown in FIG. 9. Also shown in FIG. 9 is the number of occurrences of each listed event. There is an event group for each monthly period. For increased precision, the period of time corresponding to each event group could be smaller then a month (e.g. 1 day, 1 hour, 1 min, etc). Alternatively, the period of time corresponding to each event group could be larger than a month (e.g. three-months, one year, etc).

The association rules for each two consecutive intervals are extracted (i.e., deduced), for example, by computing the probability that an event from the second monthly interval is associated with an event from the first monthly interval. For example, this probability $P(E_1,E_5)$ for the event $E_1$ (which occurred 200 times in the first month) and the event $E_5$ (which occurred 150 times in the second month) may be computed as follows:

$P(E_1,E_5)$=no. of occurrences of $E_5$/no. of occurrence of $E_1$=150/200=75%

This probability $P(E_1,E_5)$ is considered valid only if no. of occurrences of $E_5$<no. of occurrence of $E_1$. Otherwise, no association rule is extracted between $E_1$ and $E_5$. Also, if that probability $P(E_1,E_5)$ is low (e.g., less than 70%), then no association rule is extracted between the two events. For example, $P(E_1,E_{12})$=10/200=0.05% is negligible and lower than the threshold (e.g., 70%). Therefore, no association rule between $E_1$ and $E_{12}$ is extracted. FIG. 10 shows the extracted association rules, as derived from FIG. 9.

STEP 3: Extract Event Sequences

In this step, the extracted association rules shown in FIG. 10 are utilized to form sequences of events that occur with a significant probability. For example, from the two association rules shown in FIG. 11, the sequence of events in FIG. 12 is generated as the product of the corresponding probabilities for $E_1 \Rightarrow E_5$ and $E_5 \Rightarrow E_6$, under the assumption that the association rules for $E_1 \Rightarrow E_5$ and $E_5 \Rightarrow E_6$ are independent of each other. Similarly, the longest sequences of events with the high probabilities (e.g., greater than 55%) may be formed as shown in FIG. 13.

STEP 4: Clustering Events

In this step, the events of each month are clustered using the following definition. A "cluster" is the maximum set of events where the intra-distance $d(E_k, E_p)$ between any two events $E_k$ and $E_p$ in the cluster is less than a certain fixed distance $d_0$. By applying this definition to the present example with d as a simple Euclidean distance and $d_0$=2, the clusters are formed for each interval (i.e., each month) are shown in FIG. 14.

STEP 5: Create Sequences of Clusters.

FIG. 15 depicts the clusters of FIG. 14 as sequenced, wherein the probability of a cluster sequence is the product of the corresponding event sequence probabilities, under the assumption that the event sequences are independent of each other.

STEP 6: Apply the Cluster Sequences to Identify a Probable Cause of the System Failures Recall that the original problem which was to find the probable cause of the recent class of errors affecting the memory and the software B, which correspond to the events $E_{19}$ and $E_{20}$. These two events ($E_{19}$ and $E_{20}$ in month 6) form the cluster $C_{11}$ which is caused by $C_1$ (in month 1). Therefore, a probable cause of the errors affecting the memory and the software B is the set of events in the cluster $C_1$; i.e., the execution of the operation SWA-Op2 by the software A.

STEP 7: Apply the Cluster Sequences To Predict System Failures

By looking at the same cluster sequences from another perspective and noting that event $E_{14}$ belongs to the cluster $C_{10}$ whereas events $E_{15}$ and $E_{16}$ each belong to the cluster $C_{12}$, it may be concluded that if during the present month the event $E_{14}$ occurs, then it can be predicted that the events $E_{15}$ and $E_{16}$ will occur some time in the next month. Therefore, the same extracted cluster sequence can be applied to predict other system failures in the future. Note that future can not be predicted with certainty. Thus, an event predicted in accordance with the present invention has an associated probability of occurrence.

Figure 16:
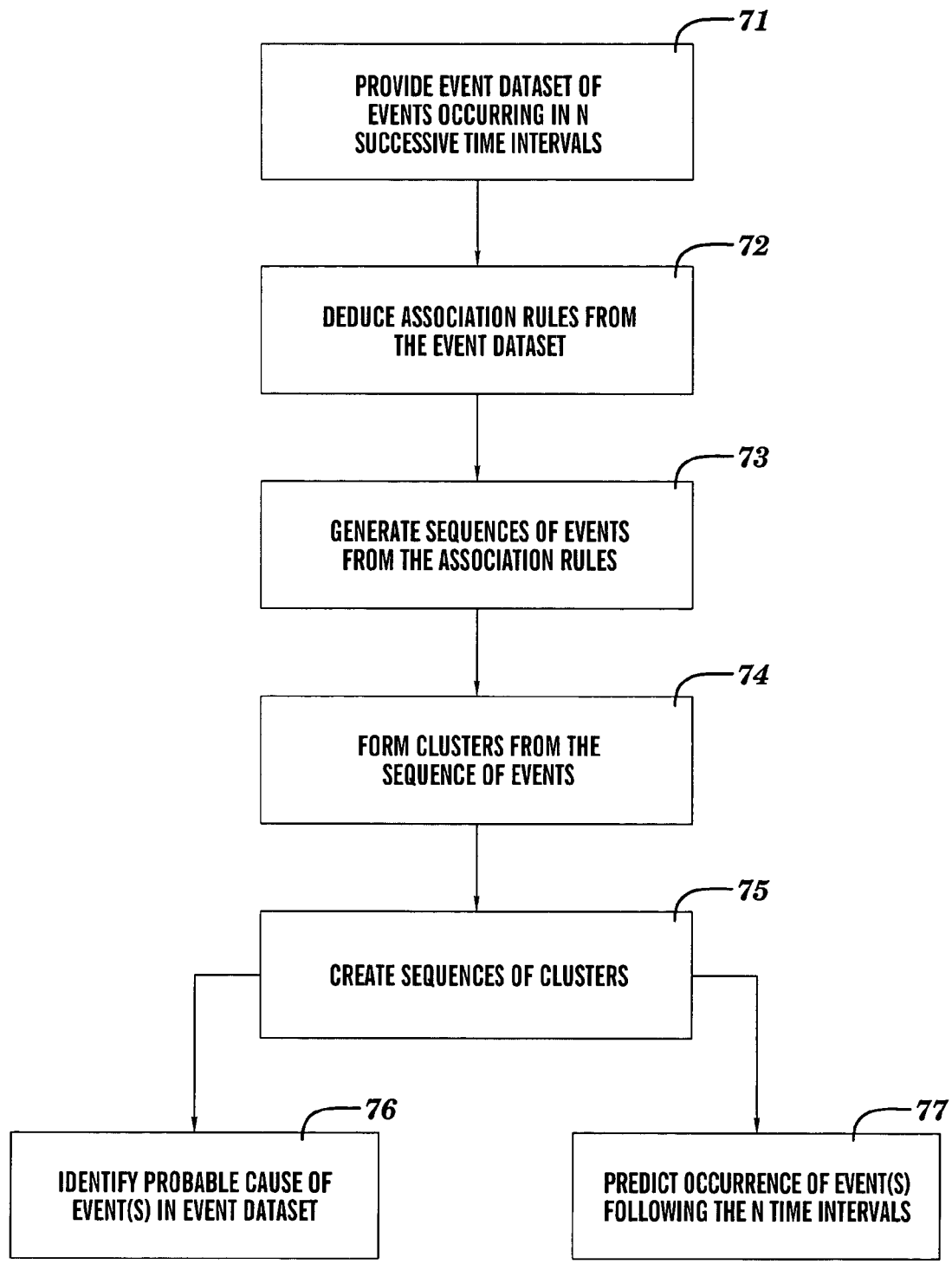
FIG. 16 is a flow chart depicting a method for associating events, in accordance with embodiments of the present invention.

In consideration of the preceding example and discussion supra thereof in conjunction with FIGS. 6–15, as well as the discussion supra of FIGS. 4 and 5, the following discussion presents a flow chart in FIG. 16 which describes the method of associating events of the present invention and a block diagram of computer system for associating events, in accordance with embodiments of the present invention.

FIG. 16 is a flow chart depicting steps 71–77 of a method for associating events, in accordance with embodiments of the present invention.

Step 71 provides an event dataset, that includes a plurality of events occurring in each of N successive time intervals $\Delta t_1, \Delta t_2, \ldots, \Delta t_{N-1}, \Delta t_N$, subject to $N \geq 3$. For n=2, 3, ..., and N–1, $\Delta t_n$ is disposed between $\Delta t_{n-1}$ and $\Delta t_{n+1}$ such that $\Delta t_{n-1}$ occurs before $\Delta t_{n+1}$. A "dataset" is defined herein as a collection of data in any known organizational structure and format (e.g., flat file(s), table(s), a relational database, etc. The N time intervals may be contiguously sequenced. An earlier time interval and a later time interval are said to be contiguously sequenced if the earliest time of the later time period coincides with the latest time of the earlier time period. Alternatively, the N time intervals may not be contiguously sequenced. An earlier time interval and a later time interval are said to not be contiguously sequenced if the earliest time of the later time period occurs after the latest time (i.e., with a time gap) of the earlier time period.

Step 72 deduces, from the event dataset provided in step 71, a plurality of association rules. Each association rule of the form $E_K \Rightarrow E_L$ expresses an association between events $E_K$ and $E_L$ respectively occurring in successive time intervals of the N time intervals. The events $E_K$ and $E_L$ are any two sequentially-ordered events in the event dataset provided in step 71.

If $E_1 \Rightarrow E_2$ and $E_2 \Rightarrow E_3$, then the association rules $E_1 \Rightarrow E_2$ and $E_2 \Rightarrow E_3$ are said to be sequentially ordered. For each pair of sequentially ordered association rules represented by $E_1 \Rightarrow E_2$ and $E_2 \Rightarrow E_3$, the association rules $E_1 \Rightarrow E_2$ and $E_2 \Rightarrow E_3$ may be independent of each other. Alternatively, for at least one such pair of sequentially ordered association rules, $E_1 \Rightarrow E_2$ and $E_2 \Rightarrow E_3$ may not be independent of each other.

Each association rule may satisfy a condition of $\alpha \leq P_{KL} < 1$, wherein $P_{KL}$ is the probability that $E_K$ and $E_L$ respectively occur in the two successive time intervals, and wherein $\alpha$ is a predetermined positive real number satisfying $\alpha < 1$. The number $\alpha$ may be predetermined to have a value reflecting the minimum probability $P_{KL}$ that the user of the method is willing to accept. For example, the following ranges for $\alpha$ may be considered as acceptable depending on the application: $0.50 \leq \alpha < 1$, $0.60 \leq \alpha < 1$, $0.70 \leq \alpha < 1$, $0.80 \leq \alpha < 1$, $0.90 < \alpha < 1$, and $0.95 \leq \alpha < 1$.

Step 73 generates a plurality of sequences of events. Each sequence of the plurality of sequences is generated from at least two sequentially ordered association rules of the plurality of association rules deduced in step 72. Each sequence may be of the form $E_1 \rightarrow E_2 \rightarrow E_3 \rightarrow \ldots E_{I-1} \rightarrow E_I$ in relation to sequentially ordered association rules $E_1 \Rightarrow E_2$, $E_2 \Rightarrow E_3, \ldots, E_{I-1} \Rightarrow E_I$ of the plurality of association rules deduced in step 72 ($I \geq 3$).

Each sequence of events may have a probability of occurrence no less than β, wherein β is a predetermined positive real number satisfying β<α. See discussion supra of step 72 for a discussion of α. The number β may be predetermined to have a value reflecting the minimum probability of occurrence of the sequence of events that the user of the method is willing to accept. For example, the following ranges for β may be considered as acceptable depending on the application: $0.20 \leq \beta < \alpha$, $0.30 \leq \beta < \alpha$, $0.40 \leq \beta < \alpha$, $0.50 \leq \beta < \alpha$, $0.60 \beta \leq \alpha$, and $0.70 \leq \beta < \alpha$.

Step 74 forms a plurality of clusters from the plurality of sequences generated in step 73, in accordance with a clustering algorithm. Each cluster of the plurality of clusters includes at least two sequences of the plurality of sequences generated in step 73.

Step 75 creates $S_C$ sequences of clusters from the plurality of clusters formed in step 74, wherein $S_C \geq 1$. Each sequence of the $S_C$ sequences includes at least two clusters of the plurality of clusters formed in step 74. The $S_C$ sequences of clusters so created may be beneficially utilized in either or both of steps 76 and 77, described infra.

Step 76 uses at least one sequence of the $S_C$ sequences created in step 75 to identify at least one event occurring in a first time interval of the N time intervals as being a probable cause of at least one event occurring in a later-occurring time interval of the N time intervals. To illustrate, in STEP 6 of the example of the preceding section, the execution of the operation SWA-Op2 by the software A in month 1 was identified as a probable cause of the errors affecting the memory and the software B in later-occurring month 6.

Step 77 uses a first sequence of the $S_C$ sequences created in step 75 to predict an occurrence of at least one event in a time interval occurring after the N time intervals, wherein the at least one event had occurred within the N time intervals. To illustrate, in STEP 7 of the example of the preceding section, from the fact that event $E_{14}$ belongs to the cluster $C_{10}$ whereas events $E_{15}$ and $E_{16}$ each belong to the cluster $C_{12}$, it was concluded that if during the present month the event $E_{14}$ occurs, then it can be predicted that the events $E_{15}$ and $E_{16}$ will occur some time in the next month.

Figure 17:
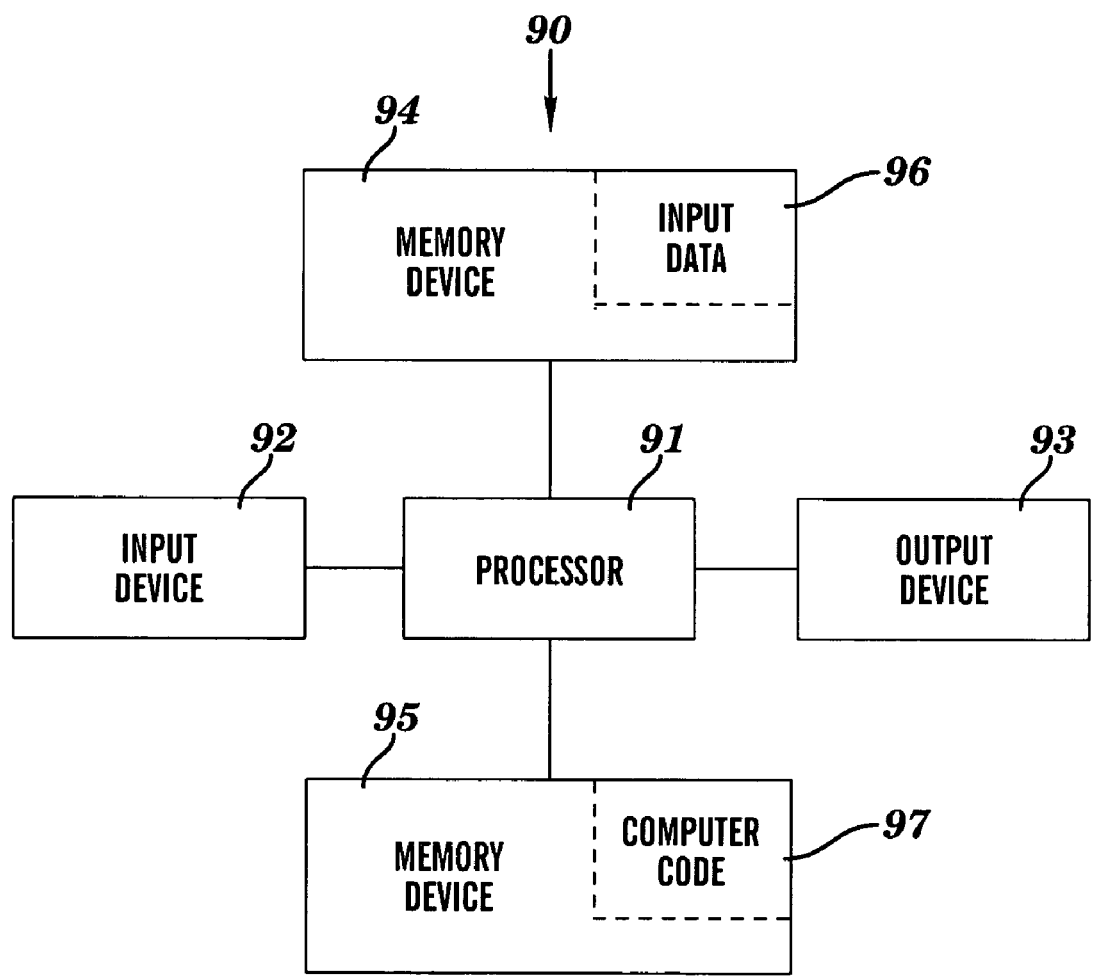
FIG. 17 is a block diagram of a computer system used for associating events, in accordance with embodiments of the present invention.

FIG. 17 is a block diagram of computer system 90 used for associating events, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for associating events. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 17) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 17 shows the computer system 90 as a particular configuration of hardware and software, any configuration of hardware and software, as would be known to a person of ordinary skill in the art, may be utilized for the purposes stated supra in conjunction with the particular computer system 90 of FIG. 17. For example, the memory devices 94 and 95 may be portions of a single memory device rather than separate memory devices.

General Formulation of the Invention

For the purpose of illustration, consider the e-Commerce environment where event notifications are generated by many event sources from various electronic marketplaces at different points of time. Assume an e-Commerce company, called xyz, decides to take advantage of the multitude of events that have occurred in the Internet in order to predict the market behavior. The company xyz may be interested in predicting the market trends and future needs of its customers. For an e-Commerce entity, customers are a crucial category of event sources. One of the important events generated by this specific source (i.e., customers) is the creation of a purchase order. As a consequence of said creation of said purchase order, a notification is sent to the e-Commerce system that is operated by the company xyz. This notification containing the detailed information about the purchase order will be stored in the database of the company xyz for further processing. If the company xyz succeeds in predicting the categories, qualities and quantities of products that will be in demand with enough confidence, then the company xyz can request the suppliers of these good to organize the required logistics ahead of time. Possessing such predictive capability will be a great asset for the company xyz over its competitors, because the company xyz will always have enough goods and better services to satisfy its customers and in general will have more useful information about the behaviors of its customers.

The basic approaches of the present invention to predicting events include: projecting occurred events of a specific event source into the future by an event projection algorithm; grouping the projected events into several event clusters by an event clustering algorithm; and predicting future events of a particular event source and future event classes based on the structure of the event clusters, which are next described.

Events projection includes the projection of the event notifications data generated during past time intervals $[t_0, t_0+\Delta t], \ldots, [t_0+(n-1).\Delta t, t_0+n.\Delta<t]$ to the future time interval $[t_0+n.\Delta t, t_0+(n+1).\Delta t]$. In the e-Commerce example, an events dataset has "events" which are records of the purchase orders generated by the customers. As stated supra, "dataset" is defined herein as a collection of data in any known organizational structure and format (e.g., flat file(s), table(s), a relational database, etc. It is desired to project the events in the events dataset to the future in order to predict the purchase orders that will occur with a certain confidence $c > c_0$, wherein $c_0$ is a predetermined confidence threshold. Although there is more than one solution for this problem, the focus on a solution herein is inspired by the fact that, in general, an event is not merely an isolated incidence, but rather a part of a set of relevant events associated with each other. The present invention takes the approach of an association rules domain to discover patterns allowing a projection of events with a certain minimum confidence. Association rules are statements of the form such as "99% of the French people who like wine also like cheese".

A formal description of association rule is as follows. Let $F=\{e_1,e_2,\ldots,e_m\}$ be a set of literals, called items. A set $X \subset F$ is called an itemset. A k-itemset is an itemset containing k items. A set of itemsets is called a database, and each element of this database is called a transaction. A transaction T contains an itemset X if $X \subset T$. An association rule is an implication of the form $X \Rightarrow Y$, where $X \subset F$, $Y \subset F$, and $X \cap Y = \phi$. The association rule $X \Rightarrow Y$ holds in the transaction set D with confidence c if c % of transactions in D that contains X also contains Y. The association rule $X \Rightarrow Y$ has support s in the transaction set D if s % of transactions in D contains $X \cup Y$. Given a database D, the problem of mining association rules is to generate all association rules that have certain user-specified support (called minsup) and confidence (called minconf). This problem can be divided in two subproblems: 1) given a specified minimum support minsup, find all combinations of items that have transaction support greater than minsup (called large itemsets—all other combinations are called small itemsets); and 2) after finding the large itemsets, generating the desired association rules. The a priori algorithm shown in Table 1 is used to find such large itemsets.

TABLE 1

A Priori algorithm $L_1$ = {large 1-itemsets};
for( k = 2; $L_{k-1} \neq \emptyset$; k++) do begin
   insert into $C_k$ // New candidates
   select p[1],p[2],...,p[k-1],q[k-1]
   from $L_{k-1}$ p, $L_{k-1}$ q
   where p[1]=q[1],...,p[k-2]=q[k-2],p[k-1] < q[k-1];
   forall transactions t c D do begin
     $C_t$ = subset($C_k$, t); // Candidates contained in t;
     forall candidates c $\in C_t$ do
       c.count++;
     end.
   $L_k$ = { c $\in C_k$ | c.count m minsup }
end The preceding algorithm in Table 1 generates the result of $\cup_k L_k$, wherein both $L_k$ and $C_k$ are itemsets containing k items. $L_k$ is a set of large k-itemsets. Each member of this set has two fields: i) the itemset and ii) the support count. $C_k$ is a set of candidate k-itemsets (potentially large itemsets). Candidate itemsets $C_k$ are stored in a hash-tree. A node of the hash-tree either contains a list of itemsets (a leaf node) or a hash table (an interior node). In an interior node, each bucket of the hash table points to another node. The root of the hash-tree is defined to be at depth 1. An interior node at depth d points to nodes at depth d+1. Itemsets are stored in the leaves. When an itemset c is added, the procedure starts from the root and go down the tree until a leaf is reached. At an interior node at depth d, it is decided which branch to follow by applying a hash function to the $d^{th}$ item of the itemset, and following the pointer in the corresponding bucket. All nodes are initially created as leaf nodes. When the number of itemsets in a leaf node exceeds a specified threshold, the leaf node is converted to an interior node. Starting from the root node, the subset function finds all the candidates contained in a transaction t as follows. If at a leaf, the procedure finds which of the itemsets in the leaf are contained in t and adds references to them to the answer set. If at an interior node which has been reached it by hashing the item I, then the procedure hashes on each item that comes after I in t and recursively apply this procedure to the node in the corresponding bucket. For the root node, the procedure hashes on every item in t.

After finding the large itemsets, the procedure uses the large itemsets to generate the desired association rules, using the association rule generation algorithm listed in Table 2. The general idea is that if ABCD and AB are large itemsets, then it can be determined if the rule AB⇒CD holds by computing the ratio r=support(ABCD)/support(AB). The association rule holds only if r≧minconf. Note that the association rule will have minimum support, because ABCD is large.

TABLE 2

Rule Generation Algorithm forall large k-itemsets $l_k$, k m 2 do begin
  $H_1$ = { consequents of rules from $l_k$ with one item in the consequent };
  call ap-genrules($l_k$, $H_1$);
end
procedure ap-genrules($l_k$: large k-itemset,
               $H_m$: set of m-item consequent)
if(k > m + 1) then begin
  insert into $H_{m+1}$
  select p[1],p[2],...,p[r-1],q[r-1]
  from $H_m$ p, $H_m$ q // $H_m$ having r members
  where p[1]=q[1],...,p[r-2]=q[r-2],p[r-1] < q[r-1];
  forall $h_{m+1} \in H_{m+1}$ do begin
    conf = support($l_k$)/support($l_k$ − $h_{m+1}$);
    if (conf ≧ minconf) then
      output the rule ($l_k$ − $h_{m+1}$) ⇒$h_{m+1}$ with
      confidence=conf and support=support($l_k$);
    else delete $h_{m+1}$ from $H_{m+1}$;
  end
  call ap-genrules($l_k$, $H_{m+1}$);
end A t-bucket is defined as a set B of event notifications fired during a specific time interval $[t_B, t_B+\Delta t]$ which is called a t-interval. Two t-buckets are t-consecutives if their t-intervals have the forms $[t_B, t_B+\Delta t]$ and $[t_B+\Delta t, t_B+2\Delta t]$ respectively. Let $(B_1, B_2)$ be a couple of t-consecutive t-buckets. Event notification $e_1 \in B_1$ and $e_2 \in B_2$ are respectively transformed to a couple $(e_1, 0)$ and $(e_2, 1)$, wherein the second element of the couple is 0 and 1, respectively, if the first element is an event notification from the older t-bucket $B_1$ and the second element is an event notification from the newer t-bucket $B_2$. This transformation is called an EI-transformation relative to $(B_1, B_2)$ and the results $EIT_{B1,B2}(e_1) \equiv (e_1, 0)$ and $EIT_{B1,B2}(e_2) \equiv (e_2, 0)$ are called e-items. The reciprocal transformation is IET( ) = $EIT^{-1}_{B1,B2}$. Let $I_1$ and $I_2$ be the results of an EI-transformation of two t-consecutives t-buckets $B_1$ and $B_2$. $I_1 \cup I_2$ is called a t-transaction. Note that $I_1 \cap I_2 = \emptyset$. A t-database D is defined as a set of t-transactions. The JY algorithm in Table 3, which takes as input a set of past event notifications fired over a relatively long period of time, generates rules which can be used to predict event notifications. The following notation is used: (1) E is a set of event notifications fired over a period of time $[t_0, t_0+n.\Delta t]$; (2) $B_k$ is the t-bucket associated with the t-interval $[t_0+(k-1).\Delta t, t_0+k \Delta t]$, k $\in \{1, \ldots, n\}$; (3) $T_k$ is the t-transaction $I_k \cup I_k'$, where $I_k$ and $I_k'$ are the result of the EI-transformation of $B_k$ and $B_k+1$. Note that $I_k \cap I_k' = \emptyset$, k$\in \{1, \ldots, n-1\}$; (4) D is the set of the t-transactions $T_k$, (a t-database), k $\in \{1, \ldots, n-1\}$; (5) L is the union of all large itemsets generated by applying the a priori algorithm of Table 1 to the database D; and (6) R is the set of rules generated by applying the rules generation algorithm of Table 2 to L.

TABLE 3

JY Algorithm

```
D = new Database( ); //create an empty database
    for (k = 1; k < n; k++) do begin
        T_k = new Transaction( ); //create an empty transaction
        forall event notifications e ∈ B_k ∪ B_{k+1}
            T_k = T_k ∪ {EIT_{Bk,Bk+1}(e)};
        end
    end
D = U_k T_k;
L = Apriori(D); // apply the Apriori algorithm to D.
R = genrules(L); // apply the rule generation algorithm to L.
B_{n+1} = new t-bucket( ); //create an empty
t-bucket for containing the predicted events.
forall association rule X⇒Y in R do begin
    if X ⊂ B_n then
        B_{n+1} = B_{n+1} ∪ IET(Y);
    end
end
```

Figure 1:
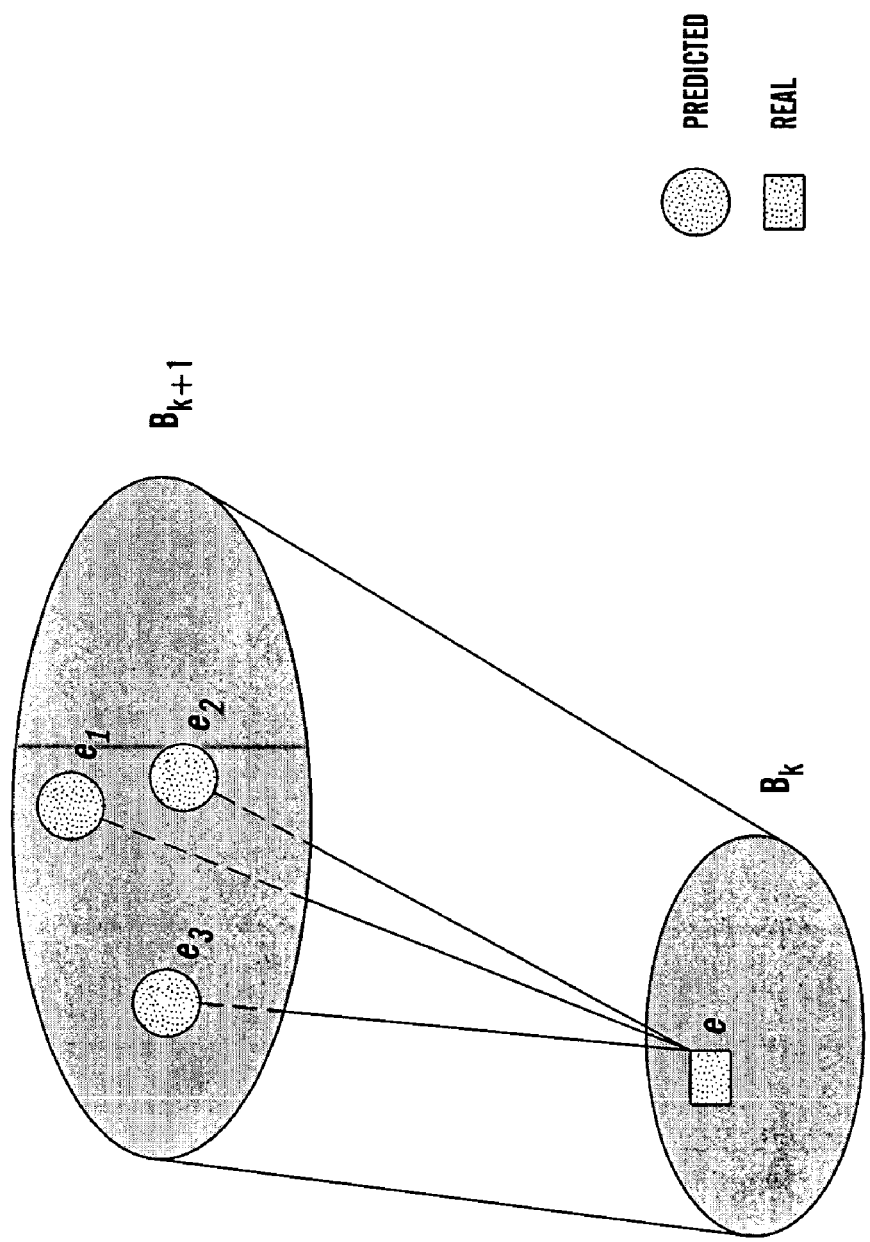
FIG. 1 illustrates an association rule, in accordance with embodiments of the present invention.
Figure 2:
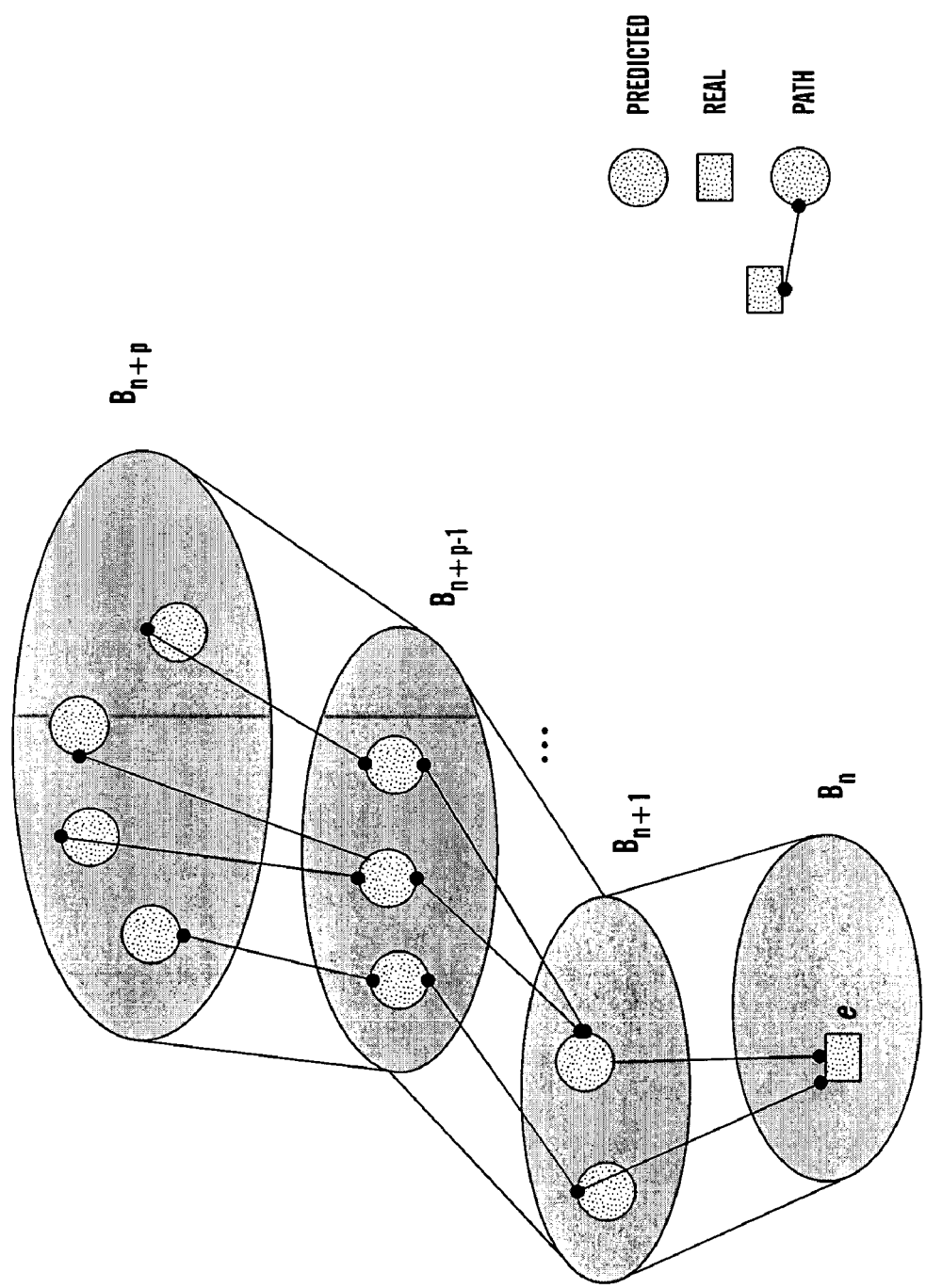
FIG. 2 which depicts sequentially-ordered sets of event notifications, in accordance with embodiments of the present invention.

$B_{n+1}$ is generated by the JY Algorithm, wherein $B_{n+1}$ is interpreted as the set of the predicted event notifications which will occur between $t_0+n\Delta t$ and $t_0+(n+1)\Delta t$. As shown in the JY-algorithm of Table 3, very efficient rule generation algorithms are used to generate predictive rules of the form "if the event e occur f times between t and $t+\Delta t$, then there is a probability 98% that the events $e_1, e_2, e_3$ will occur $f_1, f_2, f_3$ times, respectively, between $t+\Delta t$ and $t+2\Delta t$". If the first part of this rule is verified in the current t-bucket then, it can be "predicted" that the second part will be verified in the next t-bucket with 98% confidence. FIG. 1 depicts buckets $B_k$ and $B_{k+1}$ which respectively include events e and $e_1, e_2, e_3$ (with real event e in bucket $B_k$ and predicted events $e_1, e_2, e_3$ in bucket $B_{k+1}$ as shown). FIG. 1 illustrates the association rule $e \in B_k \Rightarrow e_1, e_2, e_3 \in B_{k+1}$, in accordance with embodiments of the present invention. Note that a large amount of information can be obtained from the different types of association rules. For instance, the association rule $e \in B_k \Rightarrow e_1, e_{2.1}, e_{2.2}, e_3 \in B_{k+1}$, where $e_{2.1}, e_{2.2}$ are two instances of the same event $e_2$, means that if the event e occur during the $B_k$'s t-interval, then it can be "predicted" that the event $e_2$ will occur exactly two times during the $B_{k+1}$'s t-interval (the next t-bucket) with a certain confidence. This type of association rule provides information about the frequency of the event. Other rules can provide information about the relationships between events that are part of the same transaction. In the e-Commerce example, the generated rules can be applied to predict, with a certain confidence, the number and types of the purchase orders expected in the near future. At a higher level, the generated rules can be utilized to "predict" the product categories in high demand and the new product types which the customers will be interested to buy, which will be discussed infra. Additionally, the JY algorithm can be applied recurrently to predict not only the next t-bucket, but also a certain number of future t-buckets as long as the confidence of the prediction is above a threshold value. Then, these predictions can be used to define a path of a source of events which is the set of all the events generated by that source of events. A part of this path is real and the other part is predicted as seen in FIG. 2 which depicts sequentially-ordered buckets $B_n, B_{n+1}, \ldots, B_{n+p-1}, B_{n+p}$ (with real event e in bucket $B_n$ and predicted events in buckets $B_{n+1}, \ldots, B_{n+p-1}, B_{n+p}$ as shown), in accordance with embodiments of the present invention. In the e-commerce example, the customer is one instance of events source. The path of the customer would be the set of all the past and predicted purchase orders. This path of the customer provides valuable information about the behavior of each individual customer. The combination of several customers' paths provides information about the whole direction taken by the market (see infra the next section about clustering and predicting event classes). After generating the predicted event notifications, the next step is to discover the structure of these objects in order to obtain a higher level of projection.

Next the results of the event projection are used to identify the structure of the predicted events and event notifications in order to predict event classes. For the e-Commerce example it may be desired to build a higher level of projection, by predicting the categories of goods that will be in high demand by the customers. Additionally as a "side effect", the new types of products that the customers would like to see in the marketplace may be discovered. To achieve this goal, the predicted event notifications are clustered. The result of this classification is a number of clusters that will be interpreted as the predicted event classes.

Clustering may be used for identification of homogeneous groups of objects, based on whatever data available. Consider a set $N \equiv \{e_1, e_2, \ldots, e_n\}$ of n event notifications. The cluster analysis is the set of operations that provides techniques for subdividing the set N into a certain number of classes. A classification may be either: (a) a partition $C \equiv \{C_1, \ldots, C_m\}$ of N with a suitable number m of nonoverlapping clusters $C_1, \ldots, C_m \subseteq N$, or (b) a system of hierarchically nested clusters, subclusters, . . . etc, which generates a tree or a dendogram. The predicted event notifications may be classified by going through the following steps: (a) selection of entities to cluster; (b) selection of dissimilarity measures; (c) selection of a clustering method; (d) determining the number of clusters; and (e) interpretation, testing, and replication.

(a) For the selection of entities to cluster, the predicted event notifications to be classified are selected. At this stage, "ideal types" are placed in the data sets. The data values of an ideal type are specified to represent an event notification that would typify the characteristics of a cluster suspected to be present in the data. One ideal type would be specified for each hypothesized cluster. The presence of a single ideal type in a cluster would suggest an interpretation for that cluster.

(b) The selection of a dissimilarity measure between the event notifications (or event instances) is the next step in the clustering process. The dissimilarity measure corresponds to the metric within which the clusters are believed to be embedded. That is, the measure should reflect those characteristics that are suspected to distinguish the clusters present in the data. In most cases, one can compare recovery performance between the Pearson correlation coefficient and Euclidean distance or other members of the Minkowski metric family. If a simulation study is conducted, the optimal dissimilarity measure will be highly dependent on the nature of the generated data. Rather, a simulation study can focus on a particular structure of interest.

(c) The selection of a clustering method may take into account a number of aspects, such as the following four aspects. A first aspect is that the method may be designed to recover the cluster types suspected to be present in the data. A second aspect is that the clustering method may be effective at recovering the structures for which it was designed. A third aspect is that the method may be insensitive to the presence of error in the data. A fourth aspect is that access to computer software to carry out the method may be utilized.

(d) Determining the number of clusters in the final solution is a significant problem in an applied cluster analysis. Most clustering methods are not designed to determine the number of clusters in the data. Rather in most clustering methods, the user must pre-specify the number of clusters as is the case for hierarchical algorithms. The most active research about selecting the number of clusters has involved procedures for hierarchical methods. Frequently, the methods are called stopping rules because the procedures indicate where one is to stop in the hierarchical solution. If partial agreement is found, then the procedure can opt for the larger number of clusters.

(e) Interpretation, testing, and replication completes the procedure. The interpretation is based within the applied discipline area of the researcher. Hypothesis testing can be conducted to determine whether significant cluster structure exists in the partitions found by an algorithm. Valid testing procedures generally can be divided into two major categories. The first is external criterion analysis and is based on (exogenous) variables not used in the cluster analysis. The second approach is called internal criterion analysis based on information and variables obtained from or used in the clustering.

After clustering the predicted events and interpreting these clusters as the predicted classes of events, it is desirable to attach to each predicted class a measure of confidence in this prediction. This confidence may be utilized to compare the results of several clustering methods in order to select the best one.

Figure 3:
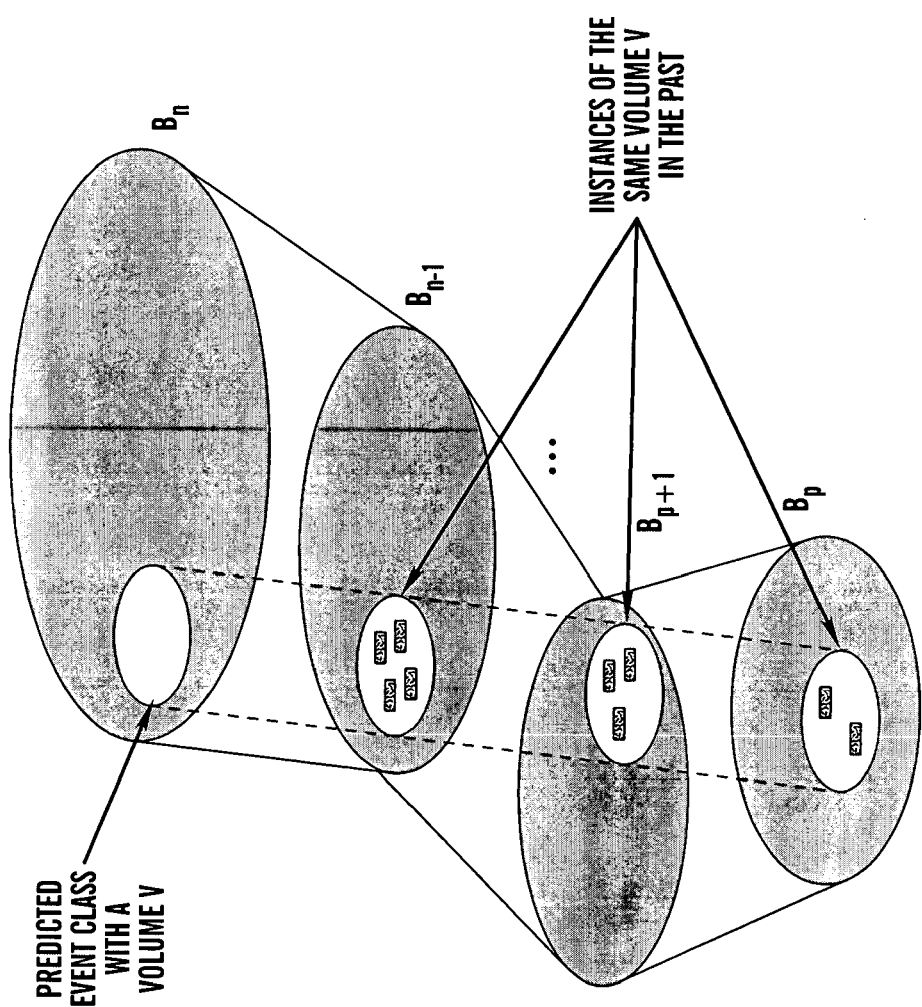
FIG. 3 depicts instances of cluster volumes at successive event notifications, in accordance with embodiments of the present invention.

As the event notification, consider a set of (key, value) pairs. Each event notification can be modeled as a vector having a dimension n. In the space of these vectors, each cluster is equivalent to a volume. For instance, this volume could be a sphere in an n-dimensional space. Let $C_n$ be a cluster of event instances included in a t-bucket $B_n$ and let $V(C_n)$ be the corresponding volume. Note that $V(C_n)$ is independent of $B_n$ and the specific event notifications contained in $C_n$. Let $B_{n-1}$ be the t-antecedent of $B_n$. The set $A(C_n)=V(C_n) \cap B_{n-1}$ of event notifications is called the antecedent of the cluster $C_n$ as illustrated in FIG. 3 which depicts instances of cluster volumes at successive event notifications in consecutive buckets $B_p, B_{p+1}, \ldots, B_{n-1}, B_n$, in accordance with embodiments of the present invention. Consider the counts $c_n, c_{n-1}, \ldots, c_{p+1}, c_p$ of the real event notification included in $A^1(C_n), \ldots, A^{p+1}(C_n), A^p(C_n)$ respectively. Then time series techniques can be applied to $(c_k)_{k \in \{p, p+1, \ldots, n-1\}}$ in order to predict $c_n$, the count of the event notifications in the cluster $C_n$. Let $c_n'$ be this predicted number. Then $|c_n - c_n'|/c_n'$ is a measure of the confidence in our event class prediction.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for associating events, comprising the steps of:

providing an event dataset that includes a plurality of events occurring in each of N successive time intervals, said $N \geq 3$, said event dataset being stored on a computer readable medium;

deducing from the event dataset a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

generating a plurality of sequences of events, each sequence of the plurality of sequences being generated from at least two sequentially ordered association rules of the plurality of association rules;

forming a plurality of clusters from the plurality of sequences in accordance with a clustering algorithm, each cluster of the plurality of clusters including at least two sequences of the plurality of sequences;

creating $S_C$ sequences of clusters from the plurality of clusters, said $S_C \geq 1$, each sequence of the $S_C$ sequences including at least two clusters of the plurality of clusters; and after the creating step, at least one of:

identifying at least one event occurring in a first time interval of the N time intervals as being a probable cause of at least one event occurring in a later-occurring time interval of the N time intervals; and predicting an occurrence of at least one event in a time interval occurring after the N time intervals, wherein the at least one event had occurred within the N time intervals.

2. The method of claim 1, wherein each pair of sequentially ordered association rules of the plurality of association rules consists of a first association rule and a second association rule, and wherein the first association rule and the second association rule are independent of each other.

3. The method of claim 1, wherein the association rules from which a first sequence of the plurality of sequences has been generated include a pair of consecutively ordered first and second association rules which are not independent of each other.

4. The method of claim 1, wherein the N time intervals are contiguously sequenced.

5. The method of claim 1, wherein the N time intervals are not contiguously sequenced.

6. The method of claim 1, wherein each sequence of the plurality of sequences is of the form $E_1 \rightarrow E_2 \rightarrow E_3 \rightarrow \ldots E_{I-1} \rightarrow E_I$ in relation to sequentially ordered association rules $E_1 \Rightarrow E_2, E_3, \ldots, E_{I-1} \Rightarrow E_I$ of the plurality of association rules, and wherein $I \geq 3$.

7. The method of claim 1, wherein said each association rule satisfies a condition of $\alpha \leq P_{KL} < 1$, wherein $P_{KL}$ is the probability that $E_K$ and $E_L$ respectively occur in the two successive time intervals, and wherein $\alpha$ is a predetermined positive real number satisfying $\alpha < 1$.

8. The method of claim 7, wherein $\alpha$ is within a range selected from the group consisting of a first range of $0.50 \leq \alpha < 1$, a second range of $0.60 \leq \alpha < 1$, a third range of $0.70 \leq \alpha < 1$, a fourth range of $0.80 \leq \alpha < 1$, a fifth range of $0.90 \leq \alpha < 1$, and a sixth range of $0.95 \leq \alpha < 1$.

9. The method of claim 7, wherein each sequence of the plurality of sequences has a probability of occurrence no less than $\beta$, and wherein $\beta$ is a predetermined positive real number satisfying $\beta < \alpha$.

10. The method of claim 9, wherein $\beta$ is within a range selected from the group consisting of a first range of $0.20 \leq \beta < \alpha$, a second range of $0.30 \leq \beta < \alpha$, a third range of $0.40 \leq \beta < \alpha$, a fourth range of $0.50 \leq \beta < \alpha$, a fifth range of $0.60 \beta \leq \alpha$, and a sixth range of $0.70 \leq \beta < \alpha$.

11. A system for associating events, comprising the steps of:

means for providing an event dataset that includes a plurality of events occurring in each of N successive time intervals, said $N \geq 3$, said event dataset being stored on a computer readable medium;

means for deducing, from the event dataset, a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

means for generating a plurality of sequences of events, each sequence of the plurality of sequences being generated from at least two sequentially ordered association rules of the plurality of association rules;

means for forming a plurality of clusters from the plurality of sequences in accordance with a clustering algorithm, each cluster of the plurality of clusters including at least two sequences of the plurality of sequences;

means for creating $S_C$ sequences of clusters from the plurality of clusters, said $S_C \geq 1$, each sequence of the $S_C$ sequences including at least two clusters of the plurality of; and at least one of:

means for using at least one sequence of the $S_C$ sequences to identify at least one event occurring in a first time interval of the N time intervals as being a probable cause of at least one event occurring in a later-occurring time interval of the N time intervals; and means for using a first sequence of the $S_C$ sequences to predict an occurrence of at least one event in a time interval occurring after the N time intervals, wherein the at least one event had occurred within the N time intervals.

12. The system of claim 11, wherein each pair of sequentially ordered association rules of the plurality of association rules consists of a first association rule and a second association rule, and wherein the first association rule and the second association rule are independent of each other.

13. The system of claim 11, wherein the association rules from which a first sequence of the plurality of sequences is generated by said means for generating include a pair of consecutively ordered first and second association rules which are not independent of each other.

14. The system of claim 11, wherein the N time intervals are contiguously sequenced.

15. The system of claim 11, wherein the N time intervals are not contiguously sequenced.

16. The system of claim 11, wherein each sequence of the plurality of sequences is of the form $E_1 \rightarrow E_2 \rightarrow E_3 \rightarrow \ldots E_{I-1} \rightarrow E_1$ in relation to sequentially ordered association rules $E_1 \Rightarrow E_2, E_2 \Rightarrow E_3, \ldots, E_{I-1} \Rightarrow E_1$ of the plurality of association rules, and wherein $I \geq 3$.

17. The system of claim 11, wherein said each association rule satisfies a condition of $\alpha \leq P_{KL} < 1$, wherein $P_{KL}$ is the probability that $E_K$ and $E_L$ respectively occur in the two successive time intervals, and wherein $\alpha$ is a predetermined positive real number satisfying $\alpha < 1$.

18. The system of claim 17, wherein $\alpha$ is within a range selected from the group consisting of a first range of $0.50 \leq \alpha < 1$, a second range of $0.60 \leq \alpha < 1$, a third range of $0.70 \leq \alpha < 1$, a fourth range of $0.80 \leq \alpha < 1$, a fifth range of $0.90 \leq \alpha < 1$, and a sixth range of $0.95 \leq \alpha < 1$.

19. The system of claim 17, wherein each sequence of the plurality of sequences has a probability of occurrence no less than $\beta$, and wherein $\beta$ is a predetermined positive real number satisfying $\beta < \alpha$.

20. The system of claim 19, wherein $\beta$ is within a range selected from the group consisting of a first range of $0.20 \leq \beta < \alpha$, a second range of $0.30 \leq \beta < \alpha$, a third range of $0.40 \leq \beta < \alpha$, a fourth range of $0.50 \leq \beta < \alpha$, a fifth range of $0.60\beta \leq \alpha$, and a sixth range of $0.70 \leq \beta < \alpha$.

21. A computer program product comprising a computer usable medium having a computer readable program embodied therein, said computer readable program adapted to access an event dataset that includes a plurality of events occurring in each of N successive time intervals, said event dataset being stored on a computer readable medium, said $N \geq 3$, said computer readable program further adapted execute a method for associating events, said method comprising the steps of:

deducing from the event dataset a plurality of association rules, each association rule $E_K \Rightarrow E_L$ of the plurality of association rules expressing an association between events $E_K$ and $E_L$ respectively occurring in two successive time intervals of the N time intervals, said events $E_K$ and $E_L$ being in the event dataset;

generating a plurality of sequences of events, each sequence of the plurality of sequences being generated from at least two sequentially ordered association rules of the plurality of association rules;

forming a plurality of clusters from the plurality of sequences in accordance with a clustering algorithm, each cluster of the plurality of clusters including at least two sequences of the plurality of sequences;

creating $S_C$ sequences of clusters from the plurality of clusters, said $S_C \geq 1$, each sequence of the $S_C$ sequences including at least two clusters of the plurality of clusters; and after the creating step, at least one of:

identifying at least one event occurring in a first time interval of the N time intervals as being a probable cause of at least one event occurring in a later-occurring time interval of the N time intervals; and predicting an occurrence of at least one event in a time interval occurring after the N time intervals, wherein the at least one event had occurred within the N time intervals.

22. The computer program product of claim 21, wherein each pair of sequentially ordered association rules of the plurality of association rules consists of a first association rule and a second association rule, and wherein the first association rule and the second association rule are independent of each other.

23. The computer program product of claim 21, wherein the association rules from which a first sequence of the plurality of sequences has been generated include a pair of consecutively ordered first and second association rules which are not independent of each other.

24. The computer program product of claim 21, wherein the N time intervals are contiguously sequenced.

25. The computer program product of claim 21, wherein the N time intervals are not contiguously sequenced.

26. The computer program product of claim 21, wherein each sequence of the plurality of sequences is of the form $E_1 \rightarrow E_2 \rightarrow E_3 \rightarrow \ldots E_{I-1} \rightarrow E_1$ in relation to sequentially ordered association rules $E_1 \Rightarrow E_2, E_2 \Rightarrow E_3, \ldots, E_{I-1} \Rightarrow E_1$ of the plurality of association rules, and wherein $I \geq 3$.

27. The computer program product of claim 21, wherein said each association rule satisfies a condition of $\alpha \leq P_{KL} < 1$, wherein $P_{KL}$ is the probability that $E_K$ and $E_L$ respectively occur in the two successive time intervals, and wherein $\alpha$ is a predetermined positive real number satisfying $\alpha < 1$.

28. The computer program product of claim 27, wherein $\alpha$ is within a range selected from the group consisting of a first range of $0.50 \leq \alpha < 1$, a second range of $0.60 \leq \alpha < 1$, a third range of $0.70 \leq \alpha < 1$, a fourth range of $0.80 \leq \alpha < 1$, a fifth range of $0.90 \leq \alpha < 1$, and a sixth range of $0.95 \leq \alpha < 1$.

29. The computer program product of claim 27, wherein each sequence of the plurality of sequences has a probability of occurrence no less than $\beta$, and wherein $\beta$ is a predetermined positive real number satisfying $\beta < \alpha$.

30. The computer program product of claim 29, wherein $\beta$ is within a range selected from the group consisting of a first range of $0.20 \leq \beta < \alpha$, a second range of $0.30 \leq \beta < \alpha$, a third range of $0.40 \leq \beta < \alpha$, a fourth range of $0.50 \leq \beta < \alpha$, a fifth range of $0.60 \beta \leq \alpha$, and a sixth range of $0.70 \leq \beta < \alpha$.

* * * * *

UNITED STATES PATENT AND TRADEMARK OFFICE
CERTIFICATE OF CORRECTION

PATENT NO. : 7,089,250 B2
APPLICATION NO. : 10/681612
DATED : August 8, 2006
INVENTOR(S) : Doganata et al.

It is certified that error appears in the above-identified patent and that said Letters Patent is hereby corrected as shown below:

In column 1, lines 40, 46 and 62; column 2, line 21; column 6, line 67; column 7, line 17; column 10, lines 10 and 28; column 14, lines 13, 43 and 67; column 15, line 50; column 16, lines 9 and 29, delete all occurrences of $\geqq$ and insert therefore $\geq$.

In column 6, lines 51, 58 and 59; column 7, lines 9 and 10; column 14, lines 45, 51, 52, 53, 61, 62 and 63; column 15, lines 52, 58, 59, 60 and 67; column 16, lines 1, 2, and 64; column 17, lines 3, 4 and 5; and column 18, lines 5, 6 and 7 delete all occurrences of $\leqq$ and insert therefore $\leq$.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,089,250 B2
APPLICATION NO. : 10/681612
DATED : August 8, 2006
INVENTOR(S) : Doganata et al.

It is certified that error appears in the above-identified patent and that said Letters Patent is hereby corrected as shown below:

On the Title Page (57)
In the Abstract, line 3 delete "$N \geqq 3$" and insert --$N \geq 3$--

Column 1
Line 24, delete "$N \geqq 3$" and insert --$N \geq 3$--

Column 6
Line 22, delete "$N \geqq 3$" and insert --$N \geq 3$--

Column 13
Line 62, delete "$N \geqq 3$" and insert --$N \geq 3$--

Column 15
Line 18, delete "$S_C \geqq 1$" and insert --$S_C \geq 1$--

Column 16
Line 62, delete "$I \geqq 3$" and insert --$I \geq 3$--

Signed and Sealed this

Third Day of April, 2007

JON W. DUDAS
*Director of the United States Patent and Trademark Office*